United States Patent [19]

Sashiki et al.

[11] 4,442,932
[45] Apr. 17, 1984

[54] COMBINATORIAL WEIGHING APPARATUS

[75] Inventors: Takashi Sashiki, Nagaokakyo; Keiko Sakaeda, Kyoto, both of Japan

[73] Assignee: Kabushiki Kaisha Ishida Koki Seisakusho, Kyoto, Japan

[21] Appl. No.: 367,667

[22] Filed: Apr. 12, 1982

[30] Foreign Application Priority Data

Apr. 10, 1981 [JP] Japan .................................. 56-54830
Sep. 4, 1981 [JP] Japan .................................. 56-139983

[51] Int. Cl.³ ........................................... B65G 37/00
[52] U.S. Cl. .................................. 198/366; 198/505; 198/356; 198/420; 198/429
[58] Field of Search ............... 198/505, 356, 358, 366, 198/370, 420, 429, 472, 648, 614; 177/25; 222/77

[56] References Cited

U.S. PATENT DOCUMENTS

| | | | |
|---|---|---|---|
| 2,470,916 | 5/1949 | Carruthers | 177/1 X |
| 3,052,340 | 9/1962 | Lyons et al. | 198/648 X |
| 4,122,941 | 10/1978 | Giles et al. | 198/505 X |
| 4,139,108 | 2/1979 | Kamp et al. | 198/429 X |
| 4,313,507 | 2/1982 | Hays | 177/25 X |

*Primary Examiner*—Joseph E. Valenza
*Assistant Examiner*—Dennis Williamson
*Attorney, Agent, or Firm*—Staas & Halsey

[57] ABSTRACT

A combinatorial weighing apparatus, having a plurality of juxtaposed weighing machines each of which is provided with a scale, for weighing articles supplied to the weighing machine scales, selecting the combination of articles that gives a total weight equal or closest to a preset target weight, and discharging the articles so selected. The apparatus includes a carry-in conveyor disposed alongside the juxtaposed weighing machines for continuously delivering vessels, filled with a suitable quantity of articles, from a filling station to a selective transfer station, transfer means for selectively transferring the filled vessels on the carry-in conveyor from the conveyor to the scales of individual ones of the weighing machines, a discharge conveyor for retaining and conveying filled vessels received selectively from the weighing machine scales and for discharging the articles from the vessels, and means for pushing the emptied vessels carried on the discharge conveyor from the discharge conveyor onto the filling station of the carry-in conveyor. The transfer means includes transfer cylinders of a number equal to the number of weighing machines, wherein transfer cylinders corresponding to weighing machines belonging to the selected combination are actuated to transfer vessels from the carry-in conveyor to the weighing machine scales and, at the same time, to transfer the vessels already placed on the weighing machine scales from the scales to the discharge conveyor by pushing them with the vessels transferred from the carry-in conveyor.

9 Claims, 13 Drawing Figures

COMBINATORIAL WEIGHING APPARATUS

BACKGROUND OF THE INVENTION

This invention relates to a combination computing-type automatic weighing apparatus in which a plurality of weighing machines are supplied with articles that do not lend themselves to easy distribution because of a comparatively high degree of adherability. The articles, such as meats, pickles, dried fish and other "sticky" produce, are fed to the weighing machines through a series of vessels which enable smooth distribution.

An automatic weighing system which is known in the art relies upon a combination computing function. The system performs a weighing operation by weighing articles which have been supplied to a plurality of weighing machines, selecting the combination of articles which give a total weight equal or closest to a preset target weight, discharging the selected articles from the system, and then supplying the emptied weighing machines with a fresh batch of articles. The above sequence describes one weighing cycle which is repeated as often as required. Unlike the older weighing apparatus which weighs articles on a single weighing machine while controlling the supply of articles to that weighing machine, the combinatorial automatic weighing system features great accuracy and excellent operability and enables articles to be weighed out to a preset weight value in a short period of time.

With the combinatorial weighing system the articles are discharged from the weighing machines in the selected combination, as mentioned above. In concurrence with the discharge operation it is necessary to supply the emptied weighing machines with fresh batches of articles while these articles are distributed or dispersed from a specific location. Conventionally, the distributive supply of the articles from the specific location is accomplished by means of a trough or dispersing bowl. Either of these expedients is sufficiently functional and improves the operability and efficiency of the automatic weighing apparatus, but the articles which they can handle effectively are limited to bulky, easily separable items which can be dispersed and introduced into the weighing machines because of their ability to move freely. Products such as pickles, meats and dried fish tend to adhere to one another and are difficult to disperse, making it difficult to supply the weighing machines smoothly with the trough or dispersing bowl arrangement.

When dealing with such "sticky" articles, therefore, it is conventional practice for the operator to disperse the articles manually among a plurality of weighing hoppers or weighing scales which are associated with the weighing machines, after which the articles selected by the combination computing process are discharged from the system manually by the operator. However, since the combination of hoppers or scales selected each time will usually differ, the locations of the hoppers or scales serviced by the operator will constantly change, making the operator's task troublesome and complex. This is especially the case when the weighing system occupies a large area because of the size or spacing of the hoppers or scales, which will depend upon the size of the individual weighing mechanisms and the size of the articles. Efficiency suffers when it is required that the operator load and unload randomly selected weighing machines which are spread over a wide area.

BRIEF SUMMARY OF THE INVENTION

Accordingly, an object of the present invention is to provide a combinatorial weighing apparatus for combinatorially weighing articles which are difficult to disperse because of a high degree of adherability.

Another object of the present invention is to provide a combinatorial weighing apparatus in which vessels accommodating articles are arrayed alongside respective ones of a plurality of equally spaced-apart weighing machines, and which operates by discharging vessels together with their articles from selected ones of the weighing machines, supplying these selected weighing machines afresh with vessels containing articles, emptying at a predetermined location the articles from those vessels which have been discharged from the weighing machines, and returning the emptied vessels to a location where they are resupplied with articles.

Yet another object of the preset invention is to provide a combinatorial weighing apparatus in which articles are introduced into vessels at a fixed supply location and emptied from the vessels automatically.

A further object of the present invention is to provide a combinatorial weighing apparatus in which vessels at a point remote from the weighing machines can be cleaned to improve measuring accuracy by eliminating errors caused by articles or residua attaching to the vessels.

Still another object of the present invention is to provide a combinatorial weighing apparatus in which weighing machines can be supplied with prescribed vessels without vessels interfering with one another.

Still another object of the present invention is to provide a combinatorial weighing apparatus in which weighing machines are not acted upon by transversely directed forces when they are supplied with vessels, and in which a zero adjustment can be carried out in a simple manner.

Other features and advantages of the invention will be apparent from the following description taken in conjunction with the accompanying drawings in which like reference characters designate the same or similar parts throughout the figures thereof.

BRIEF DESCRIPTION OF THE DRAWINGS

FIGS. 2, 3, 6 and 7 are illustrative views of vessels, in which FIGS. 2B, 3, 6 and 7 are sectional views;

FIGS. 10 and 11 are side views of a cradle and are useful in describing the relationship between the cradle and weighing machines, in which FIG. 10 shows the cradle in when elevated, and FIG. 11 shows the cradle when lowered.

DESCRIPTION OF THE PREFERRED EMBODIMENT

Figure 1:
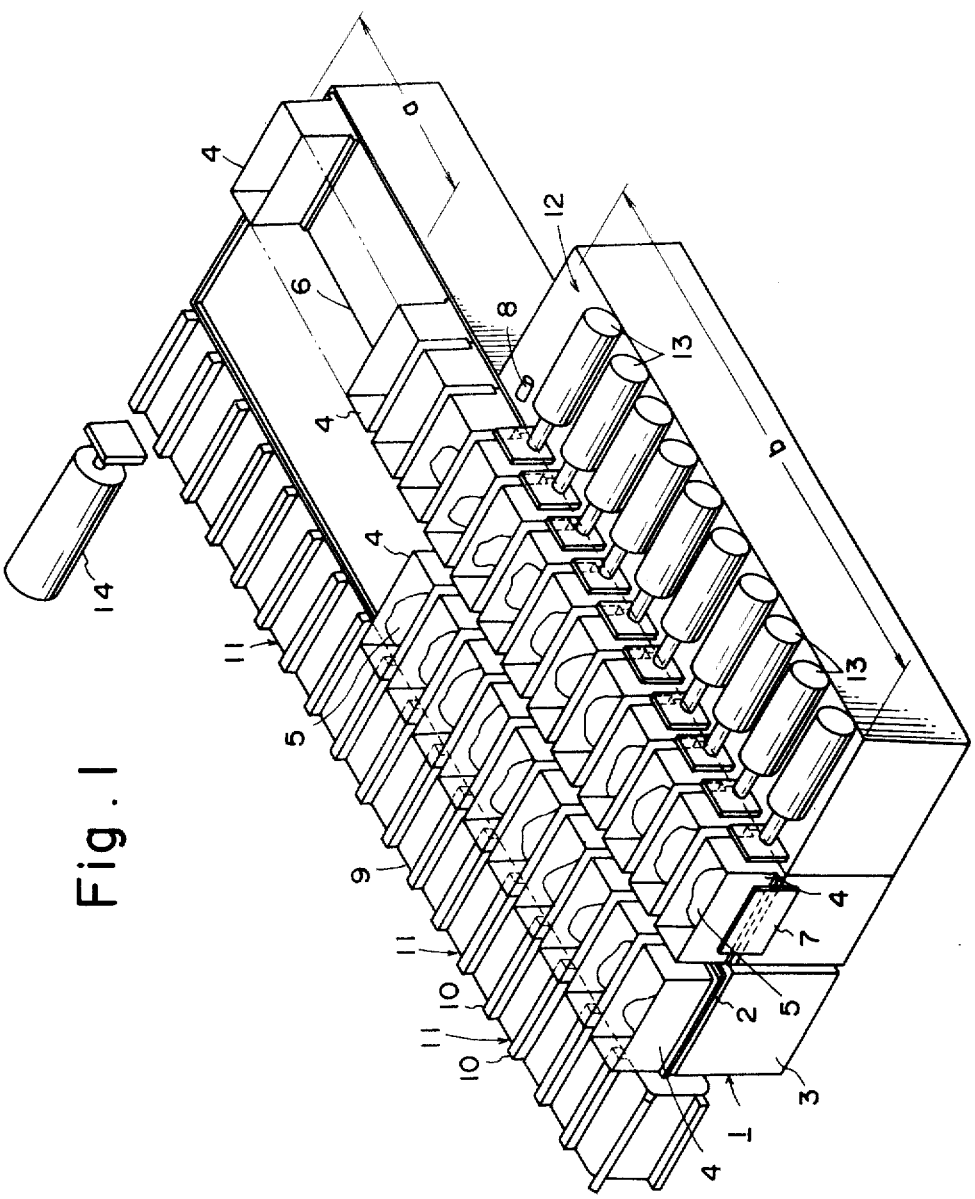
FIG. 1 is a perspective view showing a combinatorial weighing apparatus according to the present invention.

Reference will first be had to FIG. 1 to describe a combinatorial weighing apparatus according to the present invention. The apparatus includes a weighing station 1 having a plurality of juxtaposed weighing machines 3, 3 . . . , each of which is provided with a weighing scale 2. The weighing machines are arranged along a straight line and are spaced apart from one another by a suitable distance Vessels 4 are provided, each accommodating a suitable quantity of article 5. The vessels 4 are so shaped as to permit easy loading and unloading of the articles. According to the present invention, the articles 5 are carried into the weighing station 1, weighed by the weighing machines 3, and discharged from the weighing station to a discharge conveyor 9, which will be described below, all through the intermediary of the vessels 4. Further, the articles contained in the discharged vessels are subsequently emptied from the vessels at a predetermined location. A conveyor 6 for carrying in the charged vessels 4, which conveyor will be referred to as a "carry-in" conveyor hereinafter, is arranged alongside the weighing station 1 in a parallel relationship therewith, and may comprise a belt conveyor whose conveying surface has an excellent slip property, or a roller-type conveyor. The conveyor 6 is adapted to carry in a multiplicity of the filled vessels 4 from a filling station a, where the vessels 4 receive the articles 5, to a selective transfer area b where vessels are selectively introduced into the weighing station 1. The front end of the carry-in conveyor 6 is provided with an upwardly projecting stopper 7 for stopping the filled vessels 4 delivered successively by the conveyor 6, whereby the vessels 4 are lined up in a stand-by condition alongside the weighing station 1. A photoelectric switch 8 for sensing the vessels 4 carried in by the conveyor 7 is disposed at the rearmost portion of the selective transfer area b on the side thereof facing the conveyor 7. When the photoelectric switch 8 senses vessels for a period of time in excess of a certain fixed time period, this is interpreted as indicating that the number of vessels 4 lined up in a stand-by condition in the selective transfer area b is equal to the number of weighing machines 3 of the weighing station 1. A signal indicative of this fact is delivered to a control unit, which is not shown. A discharge conveyor 9 is disposed along the other side of the weighing station 1, so that the weighing station 1 is interposed between the conveyors 7, 9 extending in parallel on either side thereof. The discharge conveyor 9 may comprise an endless circulating belt conveyor or the like, and has a conveying surface which is divided transversely by elongate engaging projections 11 into sections 11 which conform to the vessel width. The discharge conveyor 9 thus is adapted to convey the vessels 4, with each vessel being retained in one of the sections 11. The engaging projections 10 function to retain the vessels 4 on the conveyor 9 in such a manner that the vessels can be moved transversely on the conveyor surface in a direction perpendicular to the direction of conveyance. Owing to the engaging projections 10, the vessels 4 can be conveyed without falling off the conveyor 9, allowing them to be inverted at the point where the conveyor changes direction as it circulates. The vessels 4 inverted in this manner discharge their contents into a suitable receptacle, and continue to be conveyed even when empty. The discharge conveyor 9 is operated at a predetermined time in such a manner that the number of sections 11 moved at one time will be equal to the number of weighing machines 3 in the weighing station 1.

A transfer mechanism 12 is disposed along the selective charging area b at the side of the carry-in conveyor 6, and includes transfer cylinders 13 of a number equal to the number of weighing machines 3. The charging cylinders 13 are arrayed at the sides of the vessels 4 which are standing by in the selective charging area b, each cylinder 13 being aligned with a corresponding vessel 4. The transfer mechanism 12 is adapted to project any of the cylinders 13 into the space over the carry-in conveyor 6 so as to push the corresponding vessels 4 onto the scales 2 of the weighing machines 3 that have been selected by a combination computing unit, not shown. A pushing mechanism 14 is disposed on that side of the discharge conveyor 9 opposite the weighing station 1, at the point where the surface of the circulating conveyor returns to the upward facing condition. When an empty vessel 4 upstream of the pushing mechanism 14 is detected by suitable means, the pushing mechanism 14 is actuated to push the detected vessel 4 forwardly in order to return it to the filling station a of the carry-in conveyor 6.

The scales 2 of the weighing machines 3 are disposed at a level slightly below that of the carry-in conveyor 6 to smoothen and quicken the introduction of the vessels 4 onto the scales 2 from the carry-in conveyor 6. A slope or incline is preferably provided between the conveyor 6 and scales 2 to facilitate the transfer. A separating mechanism (not shown) is provided between the carry-in conveyor 6 and weighing station 1 to separate the vessels 4 from one another as they stand-by on the conveyor 6, thereby preventing the vessels 4 from interfering with one another when they are placed on the scales 2.

The apparatus is so arranged that the empty vessels 4 conveyed by the conveyor 9 are washed and dried while they are in the inverted attitude on the bottom side of the conveyor.

In operation, vessels 4 filled with a suitable quantity of the articles 5 are placed sequentially on the carry-in conveyor 6, or empty vessels 4 already in place on the conveyor are filled with a suitable quantity of the articles 5 and conveyed successively to the selective transfer area b. The movement of the first vessel 4 is stopped at the front end of the carry-in conveyor 6 by the stopper 7, with subsequent vessels 4 abutting against their immediately preceding neighbors and coming to rest one after another in the selective transfer area b to assume a standby condition. When the filled vessels 4 carried in by the conveyor 6 are detected by the photoelectric switch 8 for a period of time in excess of a predetermined time period, a signal is produced to active the transfer mechanism 12. The latter pushes the vessels 4 onto the corresponding scales 2 of the weighing machines 3 in such a manner that the vessels do not interfere with one another, each vessel being separated from its neighbors. At the initial stage of operation all of the transfer cylinders 13 are activated, thereby transferring all of the vessels 4 from the conveyor 6 to the scales 2 of all the weighing machines 3. The transfer cylinders 13 are retracted to their original positions following the transfer, whereupon another series of filled vessels 4 is carried in to the selective transfer area b to assume the stand-by condition, this being accomplished by repeating the operation described above.

When the scales 2 receive the vessels 4, the weighing machines 3 perform a weighing operation and send the measured values to an electronic computing unit (not shown). The computing unit computes combinations on the basis of all received weight values and selects the combination of articles (or, more correctly, the weighing machines 3 holding these articles) whose sum is equal or closest to a set target weight. When this so-called "best" combination has been selected, the computing unit causes the transfer cylinders 13 to selectively transfer vessels 4 from the conveyor 6 to the scales 2 of those weighing machines 3 making up the best combination. The vessels 4 transferred in this manner abut against the vessels 4 carried by the scales 2 of the selected weighing machines 3 and push the vessels 4 onto the corresponding sections 11 of the discharge conveyor 9, where the vessels are retained. Upon the conclusion of the transfer operation performed by the transfer mechanism 12, the discharge conveyor 9 is activated and moved by a number of sections 11 equal to the number of weighing machines 3. The vessels 4, still retained by the conveyor 9, thus are inverted at the point where the direction of conveyance is reversed and are caused to spill their articles 5 into an automatic packaging machine, a receptacle or the like.

In the selective transfer area b where spaces form because of the vessels 4 transferred to the weighing station 1, newly filled vessels 4 are carried in by the conveyor 6 to fill the spaces and advance the remaining vessels immediately after the transfer cylinders 13 are retracted. This restores the vessels 4 in the selective transfer area b to the required number and sets the stage for the next transfer operation.

After the required number of vessels 4 are restored to the selective transfer station b and this is detected by the photoelectric switch 8, the weighing station 1 executes the next combinatorial weighing operation. In doing so, use is made of the previously measured weight values of the articles in those of the vessels 4 remaining on the weighing scales 2 that were not selected by the immediately preceding combinatorial weighing operation. The electronic computing unit computes combinations based on these already known weight values and on the weight values of articles 5 provided by the weighing machines 3 to which the vessels 4 have just been newly transferred. As before, the computing unit selects the combination of weights whose sum is equal or closest to the set target weight, vessels 4 are transferred to the weighing machines 3 belonging to the best combination, the selected vessels 4 are discharged onto the conveyor 9 from these weighing machines 3, and the articles 5 are spilled out of the vessels 4 at a predetermined location.

Empty vessels 4 from which the articles 5 have been discharged continue to be retained by the discharge conveyor 9 and, at some point in the course of conveyance, are washed out before being conveyed back to the upward facing side of the conveyor. When a vessel 4 arrives at this point, the pushing mechanism 14 is activated at the appropriate time to push the empty vessel 4 back onto the carry-in conveyor 6 in the filling station a. This is performed in successive fashion for each arriving empty vessel 4. The empty vessels 4 returned to the filling station a in this manner each receive a new supply of the articles 5.

The foregoing operations are repeated continuously to compute weight combinations, thereby providing a steady supply of articles in batches, the total weight of each batch being that which is equal or closest to the preset weight.

In the above-described weighing operation, the weighing machines 3 measure the weight of the vessels 4 along with the weight of the articles 5. Accordingly, the arrangement is such that the weight values sent to the electronic computing unit are those which result from subtracting vessel weight from total measured weight.

Figure 2A:
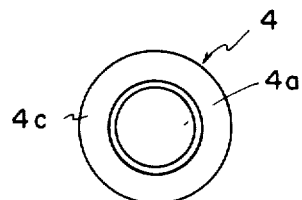
FIG. 2A is a plan view.
Figure 2B:
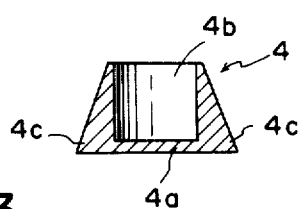
Figure 3:
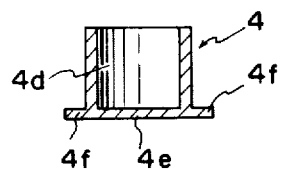
Figure 4:
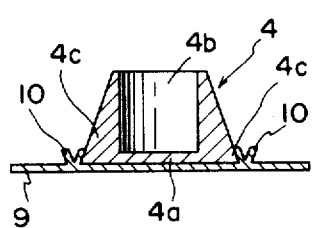
FIGS. 4 and 5 are sectional views showing a vessel carried on a discharge conveyor.

FIGS. 2 and 3 illustrate different embodiments of a vessel 4. As shown in FIG. 2, the vessel 4 is a frustoconical member having a circular bottom 4a and a cylindrically shaped cavity 4b for receiving the articles. The bottom 4a and side surface of the vessel 4 meet at an acute angle and form an engaging portion 4c which engages with a pair of the elongate engaging projections 10 of the discharge conveyor 9 (FIG. 1) when the vessel 4 is transferred to the discharge conveyor 9 from the weighing station 1. More specifically, as shown in FIG. 4, the elongate engaging projections 10 of the discharge conveyor 9 are V-shaped and retain the vessel 4 on both sides thereof by mating with the engaging portion 4c at the base of the vessel. Thus the vessel 4 can be conveyed without falling off the conveyor 9, even when the vessel is inverted. On the other hand, the vessel 4 can be transferred to the conveyor and discharged therefrom by sliding the vessel perpendicular to the direction of conveyance, that is, by moving it along the elongate engaging projections 10 on either side thereof.

Figure 5:
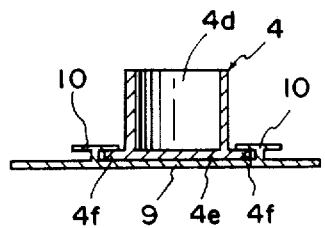

The vessel 4 shown in FIG. 3 is basically cylindrical in shape and has a flange 4f formed integrally on the bottom 4e of a cylindrical cavity 4d for receiving the articles. The flange 4f, which serves the same purpose as the engaging portion 4c shown in FIG. 2, mates with the elongate engaging projections 10 formed on the discharge conveyor 9. In this case the elongate engaging projections 10 are T-shaped, as depicted in FIG. 5.

Figure 6:
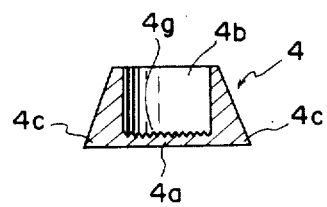
Figure 7:
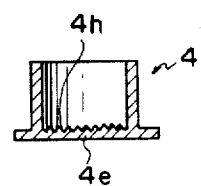

In FIGS. 6 and 7, the vessels 4 of the type described above have their bottoms 4a, 4e provided with roughened or serrated inner surfaces 4g, 4h, respectively. This reduces the area of surface contact between the articles and the bottom surface of the article receiving cavity, so that even articles with a high degree of adherability can be discharged from the vessel without adhering to the bottom surface thereof.

Figure 8:
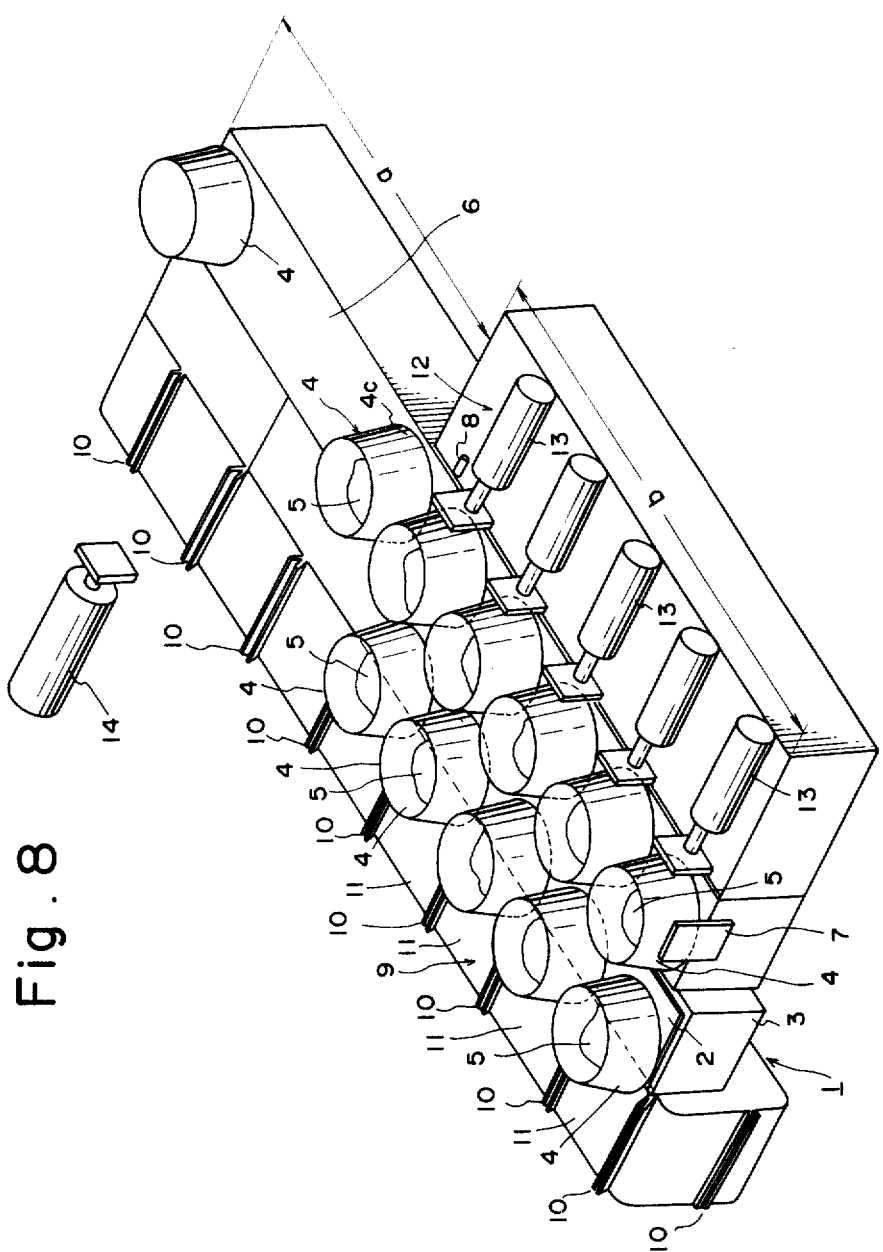
FIGS. 8 and 9 are perspective views illustrating another embodiment of a combinatorial weighing apparatus according to the present invention.

FIG. 8 illustrates a combinatorial weighing apparatus which uses vessels of the type shown in FIG. 2. The apparatus operates in entirely the same manner as the apparatus shown in FIG. 1.

Figure 9:
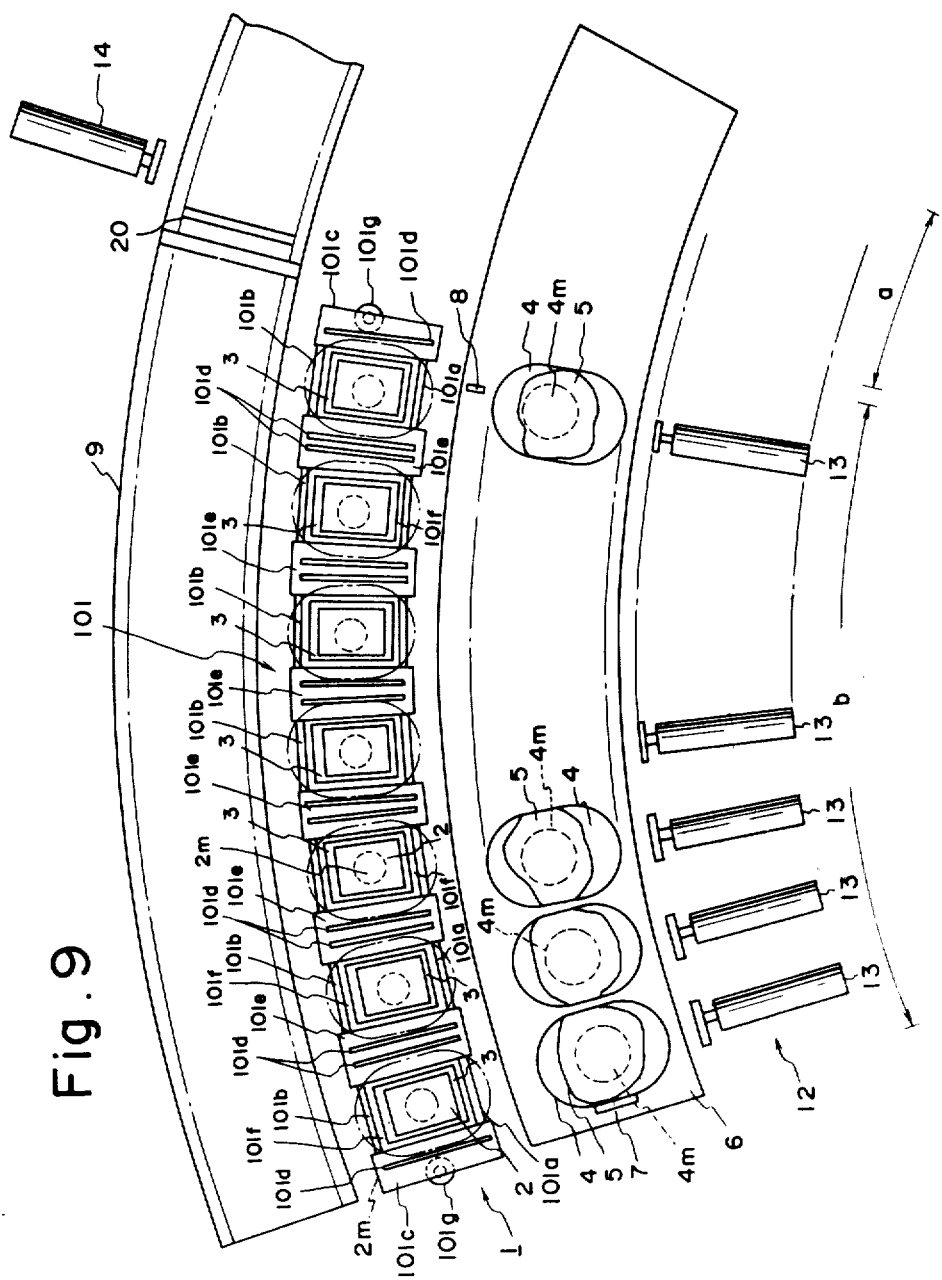

FIG. 9 is a plan view showing another embodiment of a combinatorial weighing apparatus according to the present invention. Portions similar to those shown in FIG. 1 are denoted by like reference characters. The arrangement differs from that of FIG. 1 in the following aspects: (1) the weighing station 1 has a sector shape or circular configuration, with the carry-in conveyor 6 and discharge conveyor 9 being similarly configured and arranged along the inner and outer sides of the weighing station 1, respectively; (2) a cradle 101 is supported above the weighing machines 3 to administer the delivery and receipt of the vessels 4; and (3) means are provided for magnetically attracting the vessels 4, said means comprising a magnetic body 4m mounted on the bottom of each vessel 4, and parmanent magnets which will be described later, provided on the discharge conveyor 9.

Figure 10:
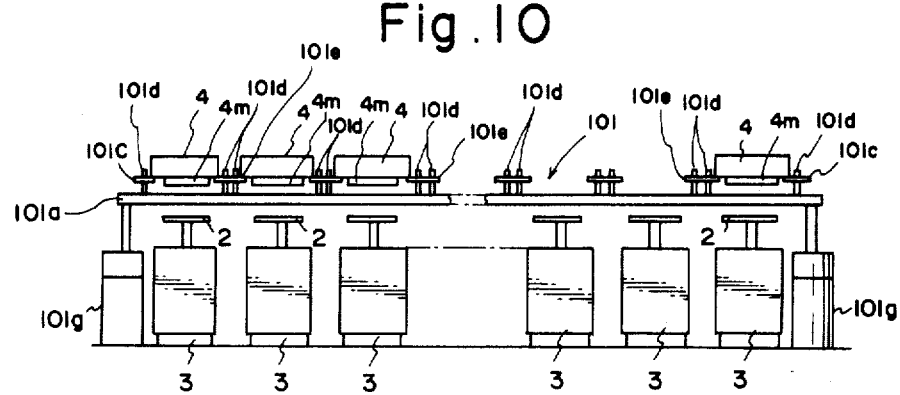
Figure 11:
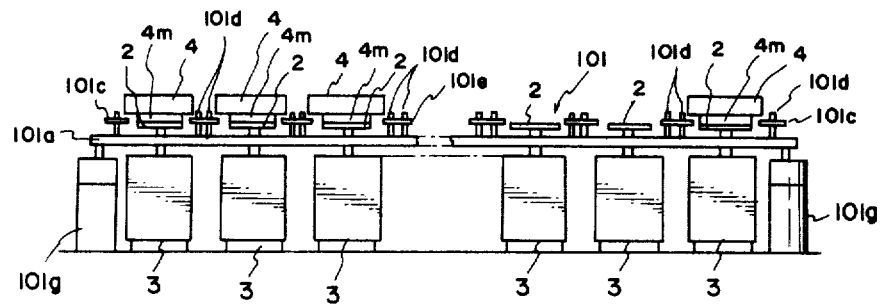

The cradle 101, shown in greater detail in FIGS. 10 and 11, is supported above the weighing station 1 and is movable vertically to deliver and receive vessels 4 and from the scales 2 of the weighing machines 3. The cradle 101 comprises rails 101a, 101b (the latter shown in FIG. 9) which are curved to match the sector or circular shape of the weighing station 1, coupling plates 101c, 101c for coupling the rails 101a, 101b together at the ends thereof, pairs of upstanding partitions 101d, 101d affixed to and bridging the rails 101a, 101b, each pair being spaced apart from its neighbors by a distance slightly greater than the width of a vessel 4, horizontally extending supporting plates 101e affixed to each pair of partitions 101d, 101d, windows 101f (FIG. 9) delimited by the rails 101a, 101b and neighboring supporting plates 101e, 101e, each window 101f being large enough to permit the passage therethrough of a corresponding scale 2, but small to prevent a vessel 4 from falling therethrough, and elevator cylinders 101g, 101g. The partitions 101d serve to guide the vessels 4 when the vessels are received from the carry-in conveyor 6 and transferred to the discharge conveyor 9, and those partitions 101d that face each other across the intervening window 101f are arranged to lie in parallel with each other. The cradle 101 is supported at either end by the elevator cylinders 101g, 101g and can be raised and lowered by these cylinders.

In operation, the cradle 101 ordinarily is positioned above the scales 2, as shown in FIG. 10. The supporting plates 101e support the vessels 4 which have been transferred from the carry-in conveyor 6 in the manner described hereinabove. When the cradle 101 is lowered by the elevator cylinders 101g, the scales 2 of the weighing machines 3 pass through the windows 101f and receive the vessels 4 from the supporting plates 101e, as depicted in FIG. 11, so that the weighing machines may weigh the vessels and their contents. Following the weighing operation the cradle 101 is raised by the elevator cylinders 101g so that the vessels 4 are transferred from the scales 2 back to the supporting plates 101e. It should be noted that the cradle 101 when in the elevated position will be approximately flush with the carry-in and discharge conveyors 6, 9.

Figure 12:
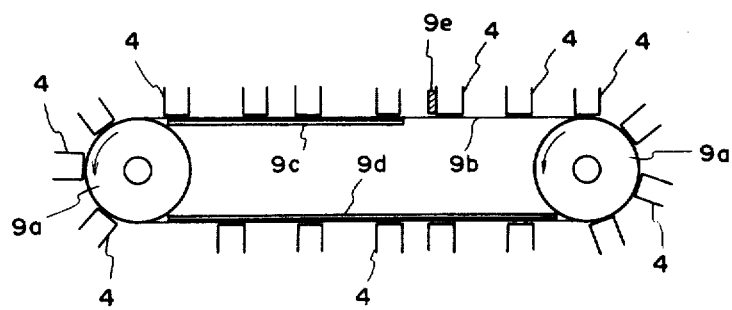
FIG. 12 shows the arrangement of a discharge conveyor.

The discharge conveyor 9 is provided with means for retaining, by means of magnetic attraction, the vessels 4 received from the weighing machines 3. As shown in FIG. 12, the discharge conveyor 9 includes a belt 9b stretched between two magnetic pulleys 9a, 9a which have an attracting function. The belt 9b has a permanent magnetic strip 9c, of a length equal to that of the weighing station 1, supported so as to underlie its upper segment. The belt also has a permanent magnetic strip 9d supported so as to overlay it lower segment, the strip 9d extending from one pulley 9a to the other. Accordingly, vessels 4 transferred to the discharge conveyor 9 are conveyed on the belt 9b by the magnetic attraction of the strip 9c, left pulley 9a, strip 9d and right pulley 9a, in the order mentioned. As the belt 9b travels, therefore, the vessels 4 are carried along thereby, inverted at the left-hand end of the conveyor to discharge their contents, and returned empty to the top of the conveyor at the left-hand side thereof whereby they are no longer subject to magnetic attraction. Means can be provided to wash the vessels after they are emptied before their return to the top of the conveyor.

In the operation of the apparatus shown in FIGS. 9 through 11, vessels 4 filled with a suitable quantity of the articles 5 are placed one after another on the filling station a of the carry-in conveyor 6, or empty vessels 4 already in place on the carry-in conveyor are filled with a suitable quantity of the articles and conveyed successively to the selective transfer area b. The movement of the first vessel is stopped in the selective transfer area b by the stopper 7, with subsequent vessels 4 abutting against their immediately preceding neighbors and coming to rest one after another in the selective transfer area to assume a stand-by condition. When the filled vessels 4 carried in by the conveyor 6 are detected by the photoelectric switch 8 for a period of time in excess of a predetermined time period, a signal is produced to extend the elevator cylinders 101g, whereby the cradle 101 is elevated to its stand-by position above the weighing station 1, and to activate the transfer mechanism 12, whereby the vessels 4 standing by in the selective transfer area b are pushed onto the supporting plates 101e of the cradle 101 while being guided by the partitions 101d. The vessels 4 come to rest over the windows 101f while supported by the supporting plates 101e. At the initial stage of the weighing operation all of the transfer cylinders 13 are activated, thereby transferring all of the vessels 4 from the carry-in conveyor 6 to the cradle 101 where the vessels are supported over the corresponding windows 101f. When this has been accomplished the elevator cylinders 101g are retracted to lower the cradle 101, allowing the scales 2 to pass through the windows 101f and receive the vessels 4 supported over the windows by the supporting plates 101e. Meanwhile, the transfer cylinders 13 are retracted to their original positions following the transfer, whereupon the carry-in conveyor 6 carries in another series of filled vessels 4 to assume the stand-by condition.

When scales 2 receives the vessels 4 from the cradle 101, the weighing machines 3 perform a weighing operation and send the measured values to the electronic computing unit, which is not shown. The computing unit computs combinations on the basis of all received weight values and selects the combination of articles (namely the weighing machines holding these articles) whose sum is equal or closest to a set target weight. When this best combination has been selected, the elevator cylinders 101g are extended to raise the cradle 101, so that the vessels 4 are lifted from the scales 2 by the supporting plates 101e and supported thereby. Thereafter the computing unit causes the transfer cylinders 13, which correspond to the selected weighing machines 3, to selectively transfer vessels 4 from the transfer station b of the carry-in conveyor 6 to the supporting plates 101e of the cradle 101 overlying the weighing machines 3. The vessels transferred in this manner abut against the vessels supported over the selected weighing machines and push these vessels onto the discharge conveyor 9.

In the selective transfer area b where spaces form because of the vessels 4 transferred to the cradle 101 over the weighing station, newly filled vessels 4 from the filling station a are carried in by the conveyor 6 to fill the spaces and advance the remaining vessels immediately after the transfer cylinders 13 are retracted. This restores the vessels 4 in the selective transfer area b to the required number and sets the stage for the next transfer operation.

The vessels 4 discharged from the weighing station are retained magnetically by the discharge conveyor 9 which conveys the vessels, inverts them to discharge their contents and then returns them empty to the top of the conveyor where they abut against a stopper 9e and are brought to rest. The empty vessels 4 are pushed back onto the carry-in conveyor 6 successively by the pushing mechanism 14 where they are replenished with articles 5 in order to take part in subsequent combinatorial weighing operations.

When the selective transfer area b is replenished with the filled vessels 4 and this fact is detected by the photoelectric switch 8, the elevator cylinders 109g are retracted to lower the cradle 101, whereby the vessels 4 supported on the supporting plates 101e are set upon the scales 2 of the weighing machines 3, which now perform the next weighing operation. In the weighing operation, use is made of the previously measured weight values of the articles in those of the vessels 4 remaining on the weighing machines 3 that were not selected by the immediately preceding combinatorial weighing operation. The electronic computing unit computes combinations based on these already known weight values and on the weight values of articles provided by the weighing machines 3 to which the vessels 4 have just been newly transferred. As before, the computing unit selects the combination of weights whose sum is equal or closest to the set target weight, vessels 4 are transferred to the weighing machines 3 belonging to the best combination, the selected vessels 4 are discharged onto the conveyor 9, and the articles are spilled out of the vessels 4 at a predetermined location.

The foregoing operations are repeated continuously to compute weight combinations, thereby providing a steady supply of articles in batches, the total weight of each batch that which is equal or closest to the preset weight.

In transferring the vessels 4 from the carry-in conveyor 6 to the scales 2 of the weighing machines 3 and then from the scales to the discharge conveyor 9, the vessels are temporarily deposited on the cradle 101 which is standing by above the weighing machines 3, and the cradle is lowered to place the vessels on the scales 2 and then raised to lift the vessels off the scales. Accordingly, only vertical loads act upon the weighing machines 3, assuring that they will not be adversely affected by transverse loads and allowing them to stabilize in a short period of time. Moreover, since the cradle 101 for delivering and receiving the vessels 4 has a sector-like or circular configuration, the partitions 101d, which guide the vessels 4 when the latter are moved, radiate outwardly from the center of the sector or circle. The vessel-receiving entrances to the spaces between the partitions 101d on the carry-in conveyor side therefore are comparatively close to one another, whereas the vessel-discharging exit from the spaces between the partitions on the discharge conveyor side are somewhat further apart from one another. The vessels 4 on the cradle 101 are thus caused to separate from one another as they are moved along the partitions 101d, so that adjacent vessels 4 will not contact and interfere with each other on the scales 2. This eliminates a major cause of weighing error.

As illustrated and described hereinabove, the present invention includes a carry-in conveyor for continuously supplying vessels filled with articles, a transfer mechanism for pushing articles individually onto weighing machines from a transfer location on the carry-in conveyor, a discharge conveyor for retaining and conveying vessels received from the weighing machines and for discharging the articles from the vessels at a predetermined location, and a pushing mechanism for pushing the empty vessels back onto a filling station, provided on the carry-in conveyor, from the discharge conveyor. Such an arrangement makes it possible to selectively introduce articles such as pickles or dried meat that are difficult to introduce automatically. According to the invention, such articles need only be fed into the containers at a predetermined location, enabling an improvement in operability. Furthermore, it is also possible to wash the empty vessels at a point remote from the weighing station to remove clinging articles or residua, thereby eliminating a source of error in order to improve weighing accuracy.

Since the carry-in conveyor, weighing station and discharge conveyor can be arranged in sector-like or circular form, vessels transferred from the carry-in conveyor to the weighing station and thence to the discharge conveyor separate naturally from one another without relying upon a special separating mechanism. Vessels transferred to the weighing machines are separated from one another in a reliable manner and will not contact and interfere with one another on the weighing machines, thereby eliminating another source of weighing error. Also, in delivering the filled vessels to the scales during a weighing operation, the vessels first are deposited on the cradle standing by above the weighing station, and then the cradle is lowered to a point below the scales to place the vessels on corresponding ones of the scales. Accordingly, each scale is acted upon solely by a vertical load; there is no laterally directed force applied to cause detrimental oscillation of the corresponding weighing machine. The result is improved weighing accuracy and increased weighing speed, the latter because the weighing machines stabilize in a shorter time. In addition, since the cradle is activated for each weighing cycle and adapted to lift all of the vessels from the scales at one time, the weighing machines are unloaded each weighing cycle and are free to be zero-adjusted at such time. This greatly facilitates the zero-adjustment operation and permits combinatorial weighing to resume immediately upon the completion of the zero-adjustment, thereby enhancing operability markedly. Since the cradle has a sector-like or circular configuration, moreover, the partitions which serve to guide the vessels radiate outwardly from the center of the sector or circle and, hence, cause the vessels to separate from one another as they are moved from the carry-in conveyor to the cradle above the weighing machines, without requiring the provision of a special separating mechanism. When the vessels are deposited on adjacent weighing machines, therefore, they will not contact and interfere with each other and cause a faulty weighing operation. Dispensing with a special separating mechanism simplifies the structure of the overall apparatus.

As many apparently widely different embodiments of the present invention can be made without departing from the spirit and scope thereof, it is to be understood that the invention is not limited to the specific embodiments thereof except as defined in the appended claims.

What we claim is:

1. A combinatorial weighing apparatus, having a plurality of juxtaposed weighing machines each of which is provided with a scale, for weighing articles supplied to the weighing machines, selecting the combination of articles that gives a total weight equal or closest to a preset target weight, and discharging the articles so selected, which apparatus comprises:

a carry-in conveyor disposed alongside said juxtaposed weighing machines for continuously delivering vessels, filled with a suitable quantity of articles, from a filling station to a selective transfer station;

transfer means for selectively transferring the filled vessels on said carry-in conveyor from said conveyor to the scales of individual ones of the weighing machines;

a discharge conveyor for retaining and conveying filled vessels received selectively from the scales of said weighing machines and for discharging the articles from said vessels; and means for pushing the emptied vessels on said discharge conveyor from said discharge conveyor onto the filling station of said carry-in conveyor.

2. The combinatorial weighing apparatus according to claim 1, in which the plurality of juxtaposed weighing machines are arrayed in the form of a sector or circle, said carry-in conveyor and said discharge conveyor being disposed along the inner and outer sides, respectively, of said sector-like or circular array of weighing machines.

3. The combinatorial weighing apparatus according to claim 1, in which said discharge conveyor has the form of an endless belt and is provided with vessel retaining means, said discharge conveyor being circulated while the filled vessels are retained thereon by said vessel retaining means, whereby the vessels are inverted to discharge their articles at a point where the conveyance direction reverses.

4. The combinatorial weighing apparatus according to claim 1 or claim 2, in which said transfer means comprises transfer cylinders of a number equal to the number of weighing machines, wherein transfer cylinders corresponding to weighing machines belonging to the selected combination are actuated to transfer vessels from said carry-in conveyor to the scales of said weighing machines and, at the same time, to transfer the vessels already placed on the scales of said weighing machines from said scales to said discharge conveyor by pushing them with the vessels transferred from said carry-in conveyor.

5. The combinatorial weighing apparatus according to claim 4, further comprising a sensor adapted to issue a signal upon sensing the fact that vessels of a number at least equal to the number of weighing machines have been delivered to the selective transfer station of said carry-in conveyor, said transfer cylinders being actuated selectively on the basis of said signal.

6. The combinatorial weighing apparatus according to claim 3, in which the bottom of each vessel is provided with a magnetic body, and said discharge conveyor comprises a pair of magnetic pulleys, a belt stretched between said magnetic pulleys and driven thereby, and magnetic strips arranged along the linear segments of said belt on the inwardly facing sides thereof, whereby the vessels are conveyed by said belt while being retained thereon by magnetic attraction.

7. The combinatorial weighing apparatus according to claim 1 or claim 2, further comprising a cradle having a plurality of windows, corresponding to the weighing machines, sized to permit the passage therethrough of the scales provided on said weighing machines, and elevator means for supporting said cradle at both ends thereof at a position above the scales of said weighing machines in such a manner that said windows overlie the corresponding scales, said elevator means being adapted to lower said cradle below the level of the scales, and to raise said cradle to said position above the scales.

8. The combinatorial weighing apparatus according to claim 7, in which said cradle is arranged in the form of a sector or circle.

9. The combinatorial weighing apparatus according to claim 2, further comprising a cradle which includes two parallel rails curved into the form of a sector or circle, pairs of upstanding equally spaced partitions affixed to and bridging said rails, and a horizontal supporting plate affixed to each pair of said partitions, said rails and said supporting plates delimiting a plurality of windows, each window being sized to permit the passage therethrough of a corresponding scale of a weighing machine and to prevent a vessel from falling therethrough, said cradle being supported for vertical movement at a position above the scales of said weighing machines in such a manner that said windows overlie corresponding scales.

* * * * *